Nov. 21, 1933. O. F. ROHWEDDER 1,935,996
BREAD SLICING MACHINE
Filed Sept. 26, 1929    10 Sheets-Sheet 7

INVENTOR
Otto F. Rohwedder
BY
Evans & McCoy
ATTORNEYS

Nov. 21, 1933.  O. F. ROHWEDDER  1,935,996
BREAD SLICING MACHINE
Filed Sept. 26, 1929  10 Sheets-Sheet 9

Fig. 18.

INVENTOR
Otto F. Rohwedder
BY
Evans & McCoy
ATTORNEYS

Nov. 21, 1933.   O. F. ROHWEDDER   1,935,996
BREAD SLICING MACHINE
Filed Sept. 26, 1929   10 Sheets-Sheet 10

INVENTOR
Otto F. Rohwedder
BY
Evans & McCoy
ATTORNEYS

Patented Nov. 21, 1933

1,935,996

UNITED STATES PATENT OFFICE 1,935,996

BREAD SLICING MACHINE

Otto F. Rohwedder, Davenport, Iowa, assignor, by mesne assignments, to The Micro Corporation, Bettendorf, Iowa, a corporation of Delaware Application September 26, 1929
Serial No. 395,218

19 Claims. (Cl. 146—153)

This invention relates to bread slicing machines, particularly to apparatus for and the method of completely slicing a whole loaf of bread in a single slicing operation, and is an improvement on the machine shown in my copending application Serial No. 249,612, filed January 26, 1928, and also is a continuation in part of my copending applications Serial Nos. 290,503 and 338,857, filed July 5, 1928 and February 9, 1929, respectively.

One of the objects of the present invention is to provide a bread slicing machine of improved and novel construction.

Another object is to provide a bread slicing machine having a new and improved feed table for supporting the bread as it is moved to the cutting blades.

Another object is to provide a bread slicing machine with means whereby a corner of the bread may be initially cut to prevent crushing of the loaf.

A further object is to provide a bread slicing machine with an improved tiltable feed table for supporting the loaf being cut and which is adapted to initially present a corner of the loaf to the cutting means so that the initial contact area is relatively small in order to prevent crushing of the loaf.

Another object is to provide a bread slicing machine with feeding means which initially presents a corner of the loaf to the cutting means and thereafter gradually increases the area to be cut.

A further object is to provide a bread slicing machine with means for feeding a loaf of bread to the cutting means in an inclined position so that a corner of the loaf is initially cut, and thereafter moving the loaf to a horizontal position as it passes through the cutting means.

A further object is to provide a bread slicing machine with a feeding means which gradually increases the speed of travel of a loaf of bread as it progresses through the cutting means.

A still further object is to provide a bread slicing machine having a feeding table and means for moving a loaf of bread over the table, with means on the moving means for holding the loaf against the feeding table as the loaf is being cut.

Another object is to provide a bread slicing machine with an improved conveyor and an improved elevator device for transferring the bread to the feed table in the correct slicing position.

With the above and other objects in view, the present invention may be said to comprise the bread slicing machine as illustrated in the accompanying drawings hereinafter described and particularly set forth in the appended claims, together with such variations and modifications thereof as will be apparent to one skilled in the art to which the invention appertains.

In the drawings which illustrate a suitable embodiment of the present invention.

It has been the practice heretofore, in machines for cutting a whole loaf of bread in a single operation, to move the bread perpendicular to the cutting blades so that the blades initially engage the entire side face of the loaf. In the case of soft or freshly baked bread which has not been permitted to completely cool, the crust is fairly tough and the center very soft and squashy, and in presenting the entire side face of the loaf to the cutting blades, it has been found that upon initial contact with the blades, the loaf crushes and distorts in such a manner that the slices will not retain their original shape, that is, the shape of the uncut loaf. This is a decided disadvantage in cutting bread in large quantities, particularly because the bread crushes and clogs the cutting blades, thereby causing the blades to heat up with the result that the cutting speed is retarded. It has also been the practice in the past to make the original cut at the same speed as the rest of the cut. This also tends to crush the bread and consequently slows up the cutting speed.

It is proposed in the present invention to overcome this disadvantage by feeding the bread at an angle to the cutting blades and at a relatively slow speed until the initial cut is made. Since a corner of the loaf is first cut by the blades, the initial contact area between the blades and the bread is relatively small. However, after the corner is first cut, the bread is fed at increasing speed from an inclined to a horizontal position, so that by the time the loaf is completely sliced, it is moved onto the delivery table in a horizontal position. It is apparent that by feeding the loaf to the slicing blades in this manner, crushing of the loaf is substantially prevented since the initial area of contact between the loaf and cutting blades is relatively small.

It is further proposed in the present invention to provide a very sanitary and safe method of cutting bread, as the device is provided with feeding and discharging mechanism which is mechanically operated and completely enclosed, so that the operator is not endangered by the slicing blades.

In general, the device of the present invention comprises a conveyor which receives bread a substantial time after it leaves the ovens and discharges the same onto an elevator or lowering mechanism which is synchronized therewith. The lowering mechanism is adapted to position the bread onto a tiltable feed table immediately after the pusher has moved a loaf through the slicing blades and has moved to a retracted position. The pusher then moves forwardly to feed the loaf supported by the feed table to the cutting blades. A single corner first engages the cutting blades as it is moved thereto by the pusher at a relatively slow speed, and after the corner is severed by the blades the bread is fed somewhat faster therethrough and is gradually moved to a horizontal position by the tiltable feed table.

Figure 1:
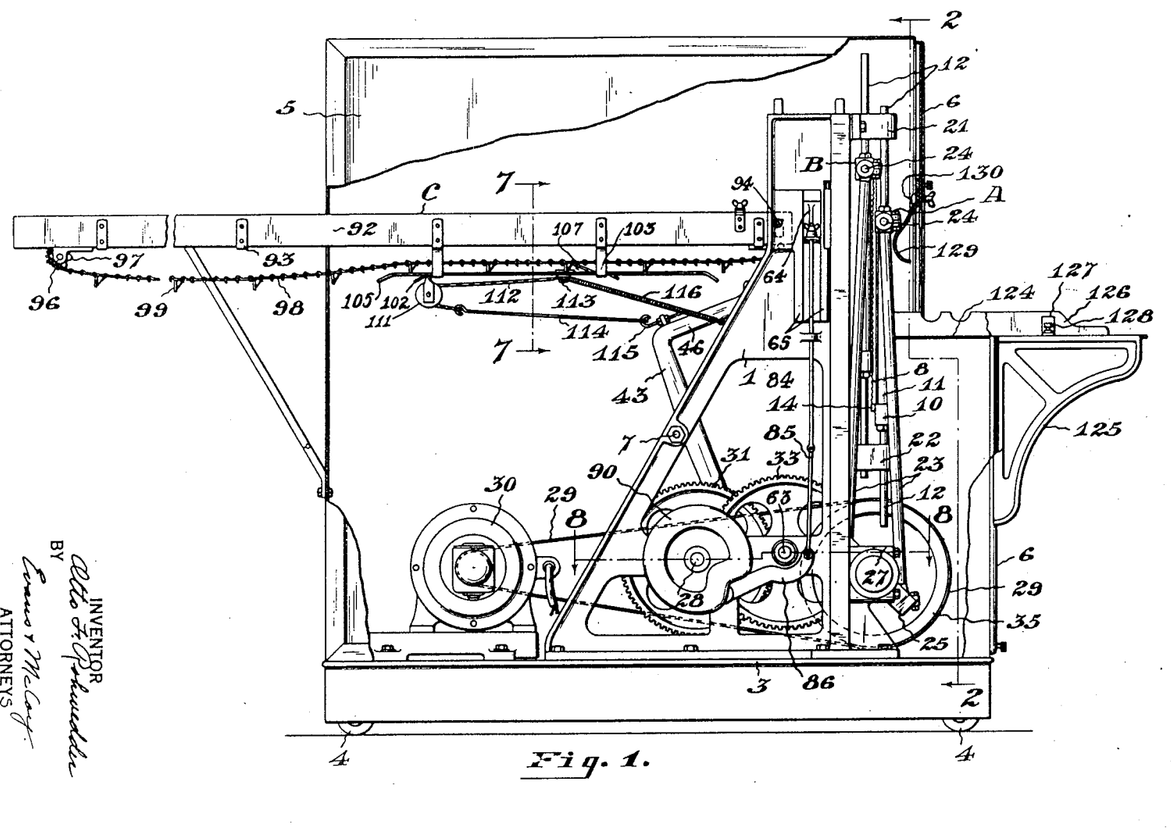
Figure 1 is a side elevation of the slicing machine, a portion of the housing being broken away to show the operating mechanism.
Figure 2:
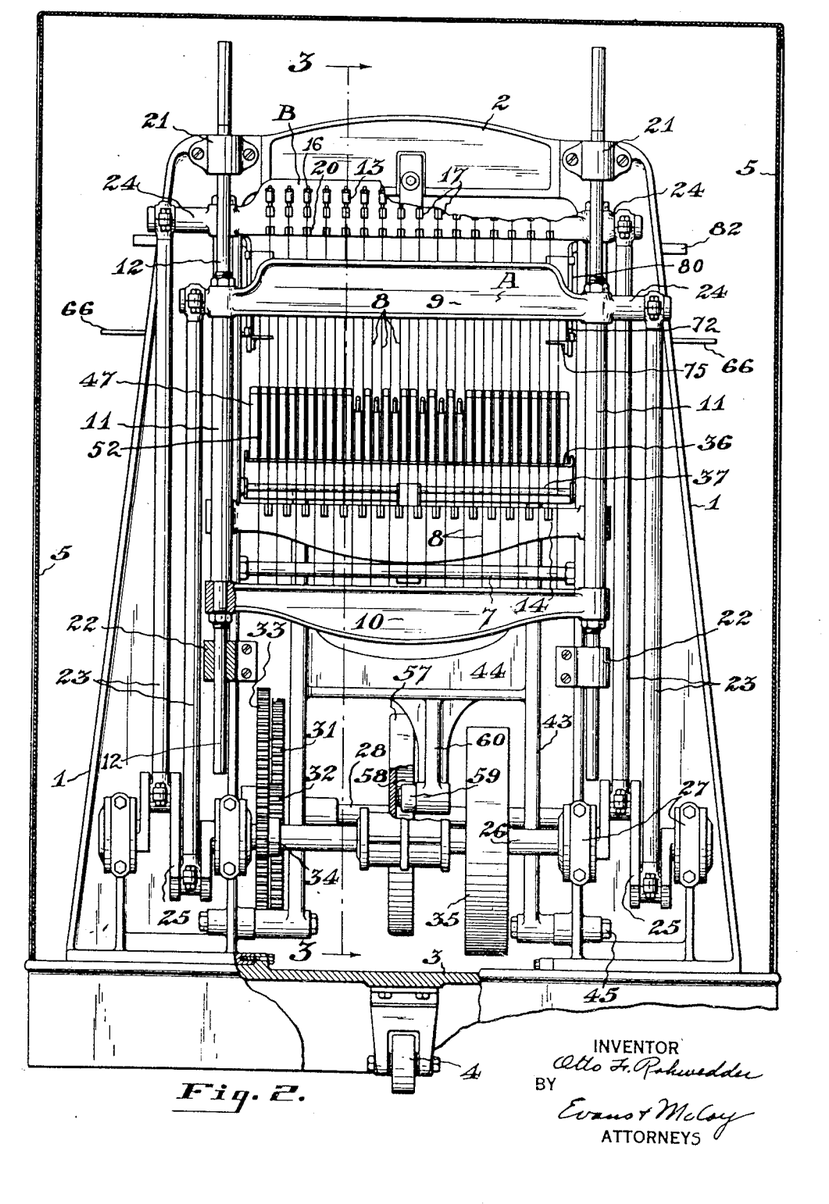
Fig. 2 is a transverse section of the machine taken substantially on the line 2—2 of Fig. 1.
Figure 3:
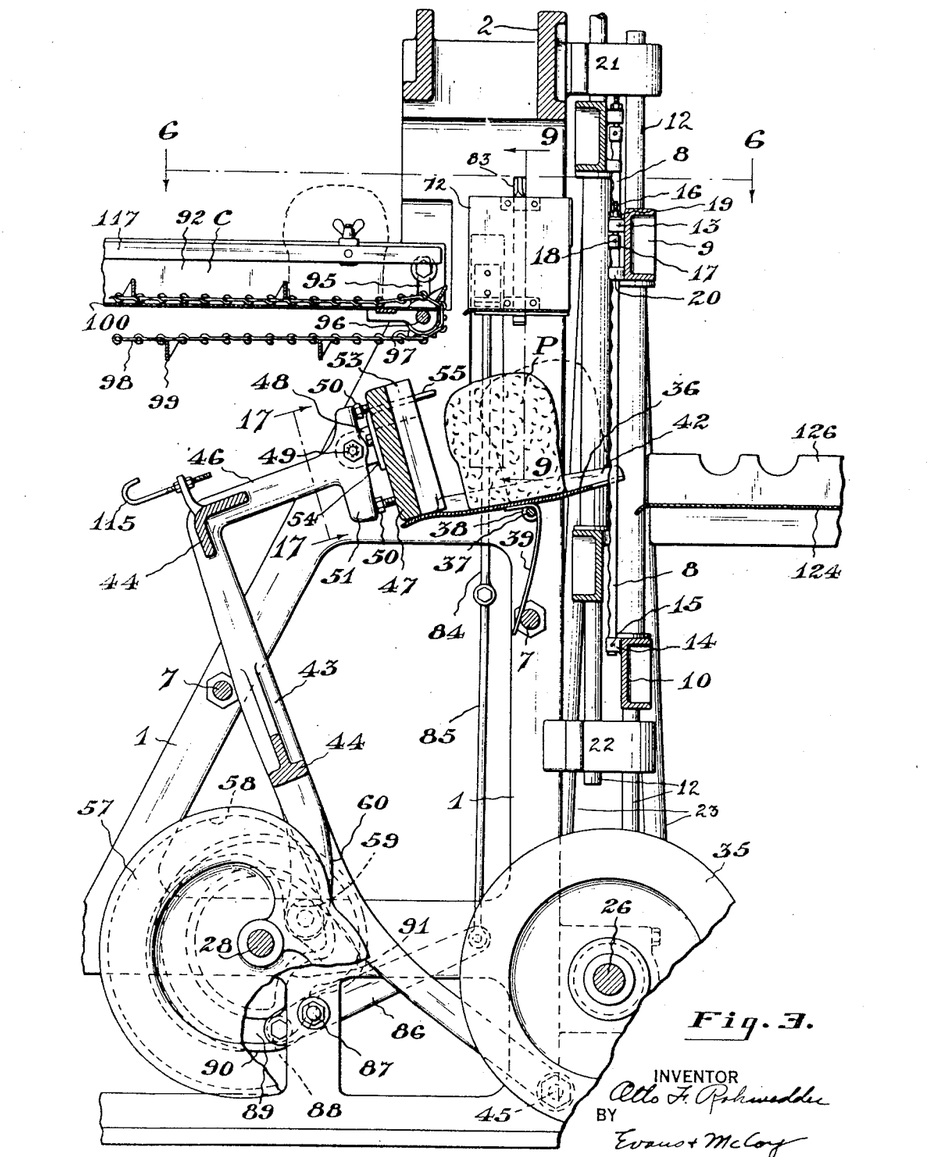
Fig. 3 is an enlarged longitudinal section taken substantially on the line 3—3 of Fig. 2, showing a loaf of bread in position on the feed table just preparatory to being sliced.

Referring to the accompanying drawings in which like numerals refer to like parts throughout the several views, the slicing machine proper as shown in Figs. 1 to 3, comprises a framework embodying a pair of spaced side members 1 interconnected at their upper ends by a cross member 2, and secured at their lower ends to a base 3 which is supported on suitable rollers 4 so that the machine can be easily moved from one part of the bakery to another. As shown in these views and more fully in Fig. 18, the machine is completely enclosed in a suitable sheathing 5, removable doors 6 being provided so that ready access to the operating mechanism can be had. Suitable brace rods 7 interconnect the side members 1 to strengthen the same.

The slicing mechanism for the machine comprises a plurality of vertically reciprocable blades 8 mounted in open frames A and B. Each blade frame is formed with top and bottom members 9 and 10, respectively, which are interconnected by side pieces 11 having end portions 12 of reduced diameter that extend through the ends of the top and bottom members 9 and 10 and are provided with nuts threaded thereon to hold the top and bottom members 9 and 10 in the correct spaced relationship. The top and bottom members 9 and 10 are formed with a plurality of regularly spaced aligned blade retaining lugs 13 and 14, respectively, the lower lugs 14 being longitudinally slotted for receiving the lower ends of the blades 8 which are secured thereto by suitable pins 15. The upper lugs 13 slidably receive threaded bolts 16 having enlarged slotted heads 17 to which the upper ends of the blades 8 are secured by suitable pins 18. As shown in Fig. 3, nuts 19 are threaded onto the bolts 16 to bear against the upper faces of the lugs 13, which when tightened put the blades in tension. The upper blade frame members 9 are preferably further provided with additional slotted lugs 20 spaced below the lugs 13 for preventing undue vibration of the cutting blades 8.

Figure 6:
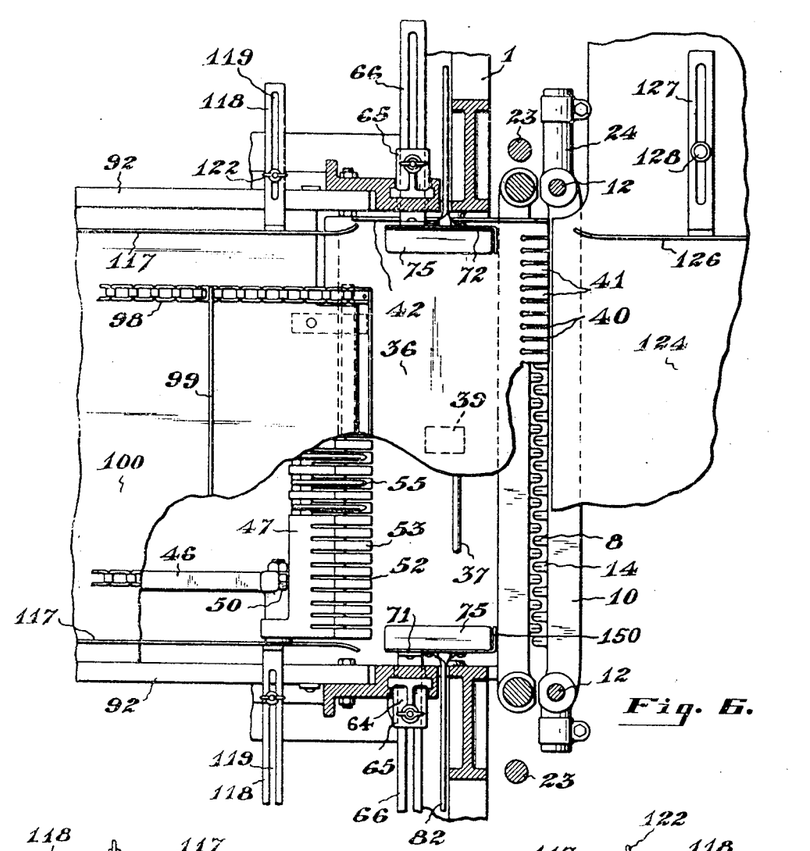
Fig. 6 is a partial plan view of the machine, portions being broken away to show the pusher, the bread lowering mechanism and other parts.

The blade frames A and B are assembled to the machine for reciprocating movement with the lugs 13 and 14 of one frame overlapping the lugs 13 and 14 of the other frame so that in operative position the blades 8 of one frame lie between the blades of the other frame, as shown in Figs. 3 and 6, and have their cutting edges in substantial alignment, with the result that in operation all the blades 8 of both blade frames A and B simultaneously engage the loaf of bread being sliced.

The blade frames are mounted for vertical reciprocating movement in opposite directions and are guided by upper and lower bored supports 21 and 22 secured to the main frame side members 1, which supports slidably receive the reduced ends 12 of the blade frame side pieces 11.

It is obvious, since the blade frames A and B reciprocate in opposite directions, that each blade 8 of the one frame moves in a direction opposite to the next adjacent blades of the other frame. In other words, alternate blades move in the same direction so that the bread will be easily sliced without crushing.

The blade frames are reciprocated by connecting rods 23 at each side which are pivoted at their upper ends to horizontal bearing extensions 24 formed at the ends of the upper blade frame members 9. The lower ends of the connecting rods 23 at each side of the machine are pivotally connected to crank arms 25 disposed substantially 180 degrees apart at the ends of a horizontally arranged rotatable shaft 26 which is secured by bearings 27 to the main frame side members 1.

The shaft 26 is preferably provided with a heavy flywheel 35 so that the momentum thereof when in rotation will assist in the reciprocation of the cutting blades 8. The shaft 26 is rotated by means of an electric motor 30 secured to the bed 3 of the machine and which drives the flywheel 35 through the medium of a suitable belt 29. It is to be understood, however, that other suitable driving means may be employed for rotating the crank shaft 35.

Figure 16:
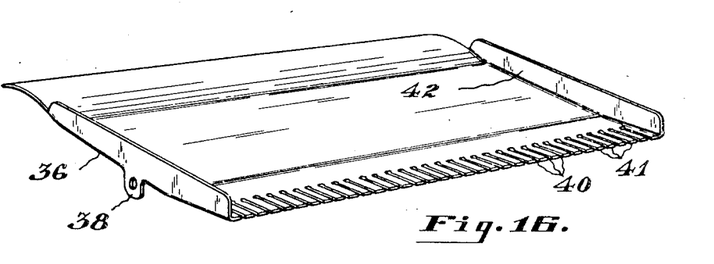
Fig. 16 is an enlarged perspective view of the feed table.

As shown in Figs. 2, 3 and 16, the loaf of bread as it is being sliced is supported on a tiltable feed table 36 which is horizontally pivoted on a rod 37 which extends between the side frame members 1 adjacent the cutting blades 8, the rod 37 being extended through depending lugs 38 formed on the lower face of the feed table 36. A spring 39 having one end secured to the lower face of the feed table 36 and the other end bearing against the frame cross rod 7 is provided to normally hold the table in a horizontal position and against the lower face of a pusher which will soon be described. The forward edge of the feed table 36 is preferably provided with a plurality of slots 40 spaced the same as the cutting blades 8 to provide projecting fingers 41 which at all times regardless of the pivoted position of the feed table 36 extend between adjacent cutting blades 8. The slots 40 are preferably slightly wider than the thickness of the blades 8 so that the blades 8 are positively guided adjacent the bottom of the bread being cut and held against vibration. By placing the blades under tension and holding them against vibration in the manner just described, it is possible to use a relatively thin blade with the result that heating of the blades when slicing doughy bread is substantially eliminated. The feed table 36 is further provided with upturned end flanges 42, the purpose of which will soon be apparent.

The bread being sliced is fed from the feed table 36 to the cutting blades 8 by means of a pusher arrangement comprising a pair of upright pusher arms 43 interconnected by cross pieces 44 and pivoted at their lower ends by pins 45 to the side frame members 1. The upper ends of these pusher arms 43 are positioned just above the plane of the feed table 36 and are formed with forwardly projecting extensions 46, to which a pusher head 47 is pivoted. The pusher head 47 is preferably provided with rearwardly extending lugs 48 which are pivoted to the forward ends of the lever extensions 46 by suitable bolts 49. As shown in Fig. 3, set screws 50 threaded into the rearward face of the pusher head 47 and bearing against the enlarged end portions 51 of the lever extensions 46 are preferably provided so that the pusher head can be adjusted to the correct position. The pusher head 47 is also provided with a plurality of narrow slots 52 slightly wider than the thickness of the blades 8 to provide parallel fingers 53 so that the fingers 53 thereof can pass between the cutting blades 8 and move the sliced loaf of bread beyond the blades 8.

The pusher head is reciprocated back and forth over the feed table 36 to feed the bread supported thereby to the cutting blades 8, the spring 39 creating sufficient pressure to cause the feed table 36 to constantly bear against the lower face of the pusher head 47. The end flanges 42 of the feed table 36 bear against and guide the pusher head as it is moved over the table 36.

Figure 17:
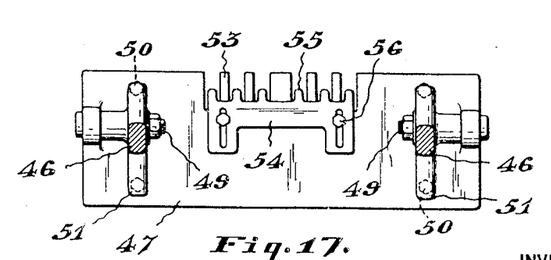
Fig. 17 is an enlarged partial rear view of the pusher taken on the line 17—17 of Fig. 3.

As shown in Figs. 3 and 17, a plate 54 having a plurality of forwardly extending prongs 55 thereon is adjustably secured to the rearward face of the pusher head 47 by bolts 56 with the prongs 55 extending beyond the forward face of the pusher head and substantially perpendicular thereto. These prongs 55 bear against the upper side of the bread as it is being sliced and assist in holding the bread against the feed table 36.

The pusher levers 43 are actuated by means of a cam 57 which is secured to a drive shaft 28 intermediate the ends thereof. This cam is preferably provided with an axial cam groove 58 within which a horizontal cam roller or follower 59 is carried by a portion 60 depending from the lower lever cross piece 44. It is obvious that during rotation of the shaft 28 the cam follower 59 will follow in the groove 58 and cause the pusher levers 43 to reciprocate the pusher head 47 over the feed table 36.

The cam groove 58 is so shaped that it will drive the pusher arms 43 forwardly at a very slow initial speed until the corner of the bread has been severed, which speed will be accelerated until the pusher arms reach their extreme forward position, thus feeding the loaf of bread to the cutting blades very slowly at first and more rapidly as it progresses through the blades.

This accelerating action is quite important in slicing fresh bread since it will not withstand much pressure without crushing. Crushing of the loaf is prevented in the present invention by slowly cutting the crust of the loaf and then more rapidly cutting the remainder of the loaf.

Figure 8:
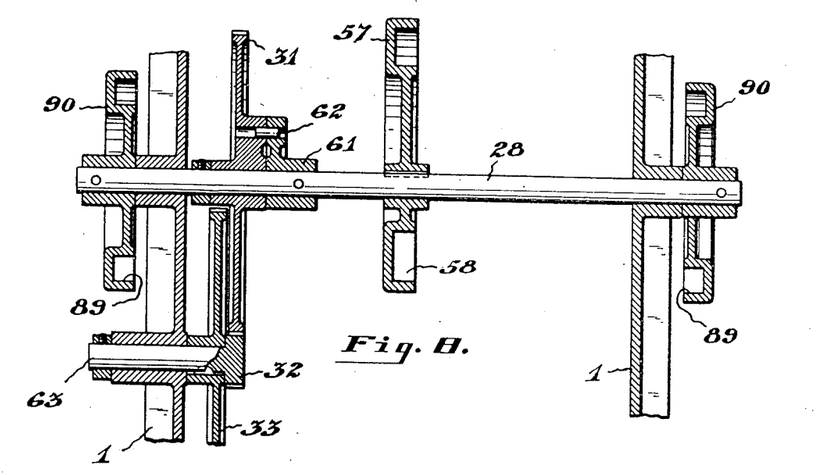
Fig. 8 is an enlarged transverse section of the driving mechanism taken substantially on the line 8—8 of Fig. 1.

As shown in Fig. 8, the shaft 28 is provided with a gear 31 rigidly secured thereto which meshes with a pinion 32 that is formed at the end of a freely rotatable stub shaft 63, the stub shaft 63 being mounted in one of the side frame members and provided with a gear 33 securely keyed thereto. The gear 33, as shown in Fig. 2, meshes with a small pinion 34 which is secured to the main or crank shaft 26. It is obvious that while the crank shaft 26 is driven at a relatively high speed to rapidly reciprocate the blade frames A and B, the shaft 28 and cam 57 will be rotated at a relatively low speed because of the reduction gearing just described.

As shown in Fig. 8, the gear 31 which drives the shaft 28 is loosely mounted on the shaft 28 and is connected with a hub member 61 that is keyed to the shaft 28, only by means of a shear pin 62. The shear pin 62 is preferably of a suitable soft metal so that the same will shear before the pusher arms 43 would break in cases where the arms are prevented from making a complete reciprocation.

The bread is fed to the machine by means of a conveyor C which deposits the same onto a pair of elevator devices that move downwardly and deposit the bread onto the fed table 36 in the correct slicing position. These elevator devices are slidably mounted in each side frame 1 to reciprocate in a vertical direction and, as shown in Figs. 9, 10, 14 and 15, each device comprises a slide member 64 having its sides vertically guided in spaced ways 65 that are provided on the outer face of the frame side member 1. The lower end face of the slide member 64 is formed with a horizontal downwardly presenting channel portion that slidably receives a support 66 which is slotted at 67 and secured in the desired horizontal position to the slide member 64 by means of a bolt 68 which extends through the slot 67. A wing nut 69 is threaded onto the bolt 68 so that it can be loosened to permit the elevator device to be adjusted in order that loaves of bread of various lengths can be accommodated.

The support 66 extends through a slot 70 in the side frame member 1 and is bent upwardly at right angles at its inner end to provide a flange 71. As shown in the several views, a vertical side plate 72 is secured to the flange 71 by rivets or in any other suitable manner. This side plate 72 is positioned adjacent to and parallel with the frame side member 1 and the lower edge thereof is provided with a pair of spaced, rolled hinge portions 73 which receive a hinge pin 74.

Figure 14:
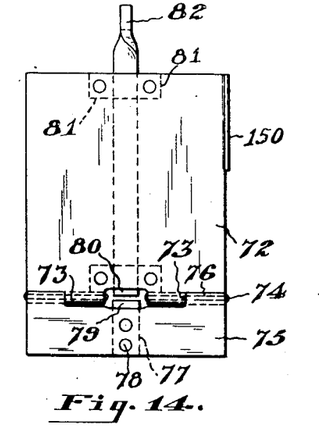
Fig. 14 is a side elevation of one of the elevator devices showing the supporting plate thereof in released position.
Figure 15:
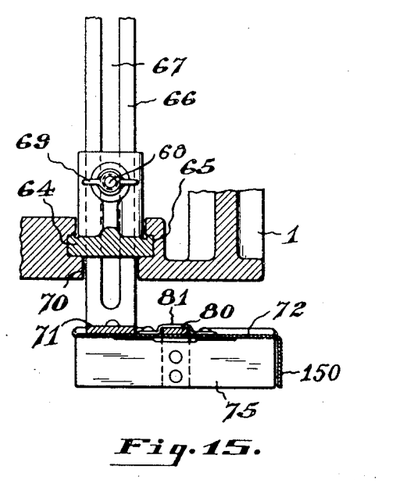
Fig. 15 is a section taken on the line 15—15 of Fig. 9.

A bread supporting plate 75 is hinged to the hinge pin 74 by means of rolled portions 76 which are in axial alignment with the hinge portions 73 of the side plate 72 and are positioned outwardly thereof, as clearly shown in Fig. 14.

Figures 9, 10:
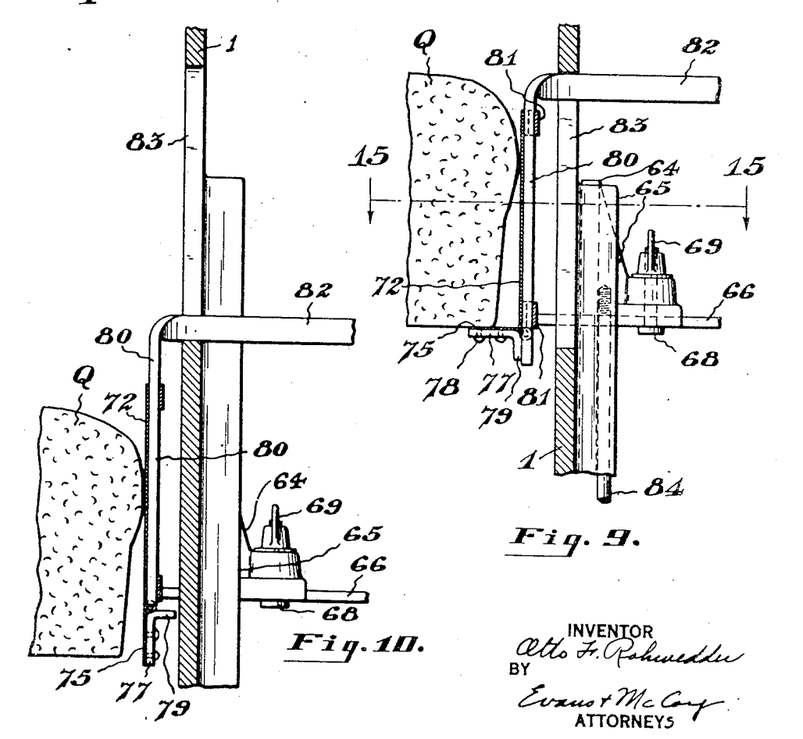
Fig. 9 is a section of one of the lowering devices taken on the line 9—9 of Fig. 3, showing the same in its uppermost position with a loaf of bread positioned thereon.
Fig. 10 is a view similar to Fig. 9 showing the device in its lowermost position and showing the loaf of bread as it is discharged therefrom.

A strap 77 is preferably secured to the lower face of the bread supporting plate 75 by rivets 78 or other suitable securing means and is formed with a right angled flange 79 which, when the plate is in a horizontal position as illustrated in Fig. 9, has its outer face substantially flush with the outer side face of the vertical side plate 72. This strap 77 provides a means for holding the plate 75 in normal bread supporting position and is adapted to cooperate with a vertically slidable latch bar 80. The latch bar 80 is positioned intermediate the edges of the side plate 72 and vertically slides against the same, it being guided for vertical movement by a pair of spaced guide straps 81 which are secured to the outer face of the side plate 72.

As shown in Figs. 9 and 10, the latch bar 80, when in its lowermost position, extends downwardly between the hinge portions 73 and abuts against the face of flange 79 of the strap 77, thereby holding the bread supporting plate in its normal horizontal position. When the latch bar 80 is in its uppermost position as indicated in Fig. 10, the lower end is disengaged from the flange 79 of the strap 77 so that the bread supporting plate 75 can swing downwardly to discharge the bread supported thereby.

The upper end of the latch bar 80 is twisted and bent horizontally outwardly to extend through a slot 83 formed in the frame side member 1, the ends of the slot 83 providing means for tripping the latch bar 80. In other words, as the elevator device is moved downwardly and approaches its lowermost position, the outwardly bent portion 82 engages the lower end of the slot 83 thereby holding the bar 80 while the device continues on its forward movement with the result that the latch bar is disengaged from the flange 74 of the bread supporting plate. Also, when the elevator device is moved upwardly the outwardly bent portion 82 engages the upper end of the slot 83, holding the bar 80 against further movement while the elevator device continues the upward movement with the result that the flange 79 strikes the end of the latch bar 80 and swings the bread supporting plate to its horizontal position as indicated in Fig. 9.

Two of such elevator devices are provided in horizontal alignment directly above the feed table 36 for transferring the bread to be cut from the conveyor C to the feed table.

These devices are synchronized with the conveyor and with the pusher 47 and each device is operated by means of vertically guided rod 84 suitably secured to the slide member 64 and having a link 85 pivoted to its lower end. The link 85 as shown in Figs. 1 and 3 is pivoted to one end of a lever 86 which is pivoted intermediate its ends by a pin 87 to the frame side member, the other end being provided with a cam follower 88 (shown in broken outline in Fig. 3). The cam follower 88 projects into and is actuated by a cam groove 89 formed in a cam member 90 which is secured to the pusher actuating shaft 28.

The cam groove 89 is for the greater portion of its length concentric with the shaft 28 which thereby does not permit of any movement of the lever 86, but for the remainder of its length is formed with a pronounced depression 91 therein.

Referring to Fig. 3, the shaft 28 rotates in a counter-clockwise direction and just before the pusher reaches its rearmost position, the cam follower 88 suddenly descends into the depression 91 thereby causing the forward end of the lever 86 to swing downwardly and lower the elevator device so that it can discharge the loaf of bread supported thereby onto the feed table 36 in front of the pusher 47. Upon further rotation of the shaft 28, the cam follower 88 moves out of the depression 91 and consequently the elevator device moves to its uppermost bread receiving position. By the time the elevator device reaches its uppermost position, the pusher 47 has reached its completely retracted position, the cam follower 59 for the pusher being at its lowest position in its groove 58. The respective positions of the cam followers 59 and 88 and their respective cams are shown in Fig. 3. The pusher 47 then makes one complete reciprocation to move the bread through the blades 8 and the elevator device then again moves downwardly, and the cycle of operation is completed.

As previously stated, the bread is fed to the elevator devices by means of a conveyor C. This conveyor may be of any suitable type but preferably comprises a pair of horizontal spaced side members 92 secured together by cross bars 93 and secured to their adjacent frame side members 1 by bolts 94 which extend through vertical slots 95 in the side members 1 to permit vertical adjustment of the conveyor, the purpose of which will be soon set forth.

Figure 7:
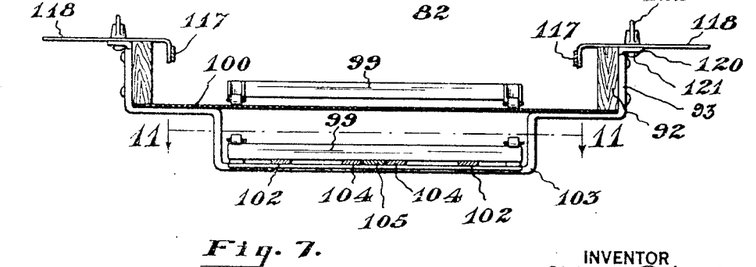
Fig. 7 is an enlarged transverse section of the conveyor taken substantially on the line 7—7 of Fig. 1.

The conveyor side pieces 92 are provided with horizontal shafts 96 at their front and rear ends which carry spaced chain sprockets 97, each pair of front and rear sprockets being interconnected by an endless link chain 98. The link chains 98, as shown in Figs. 6 and 7, are connected at regularly spaced intervals by cross bars 99. The chains 98 and connecting cross bars 99 will hereinafter be referred to as the conveyor belt.

As shown in Figs. 3 and 7, the top and bottom portions of the conveyor belt are separated by a sheathing 100 secured to the lower sides of the conveyor side pieces 92, the upper portion of the belt being seated on the sheathing 100 so that the bread supported by the sheathing 100 can be moved by the belt cross bars 99 from the rear end of the conveyor to the forward end thereof and discharged onto the elevator devices.

The lower portion of the conveyor belt is supported, as shown in Figs. 7, and 11 to 13, by a pair of longitudinal bars 102 which are secured to dropped portions 103 of side member connecting bars 93.

Figure 11:
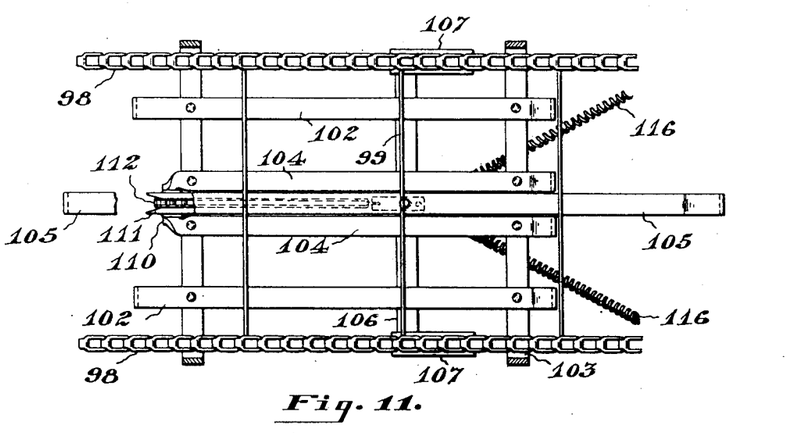
Fig. 11 is a horizontal section of the conveyor taken on the line 11—11 of Fig. 7.
Figure 12:
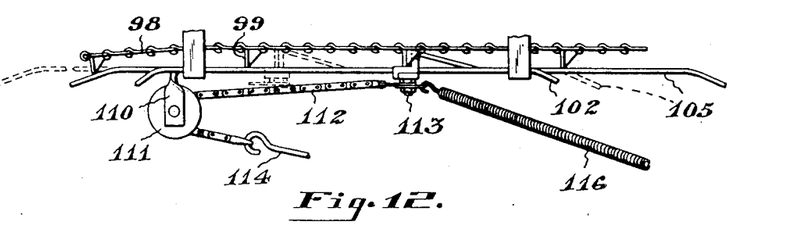
Fig. 12 is a side elevation of that portion of the conveyor shown in Fig. 11.

The conveyor belt is adapted to be intermittently moved upon each forward movement of the pusher 47 and this is accomplished in the following manner. As shown in Fig. 11 a pair of spaced guide bars 104 are secured to the upper surfaces of the cross bars 103 between the bars 102, and a slide bar 105 is slidably positioned on the cross pieces 103 between the guide bars 104.

A transversely extending cross member 106 is secured to the slide bar 105 and below the longitudinal bars 102 and 104. In this way, the slide bar 105 is guided against lateral displacement by the guide bars 104, against downward movement by the depending portions 103 of the tie bars 93, and against vertical movement by the cross bar 106 which engages the lower faces of the longitudinal members 102 and 104.

Figure 13:
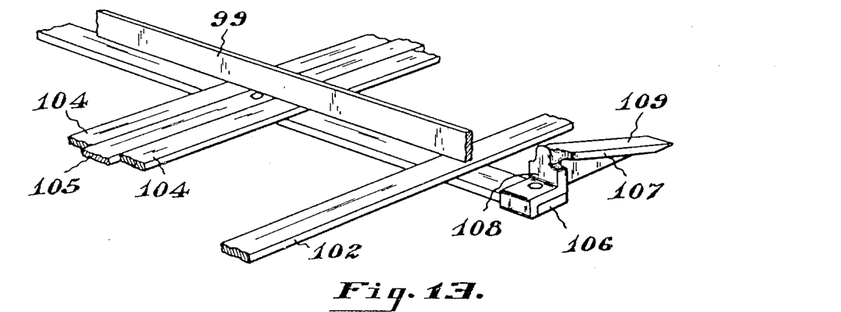
Fig. 13 is a fragmentary perspective view of the device for operating the conveyor.

The cross bar 106 is preferably provided, as shown in Fig. 13, with a ratchet member 107 at each end which is formed with a vertical slat engaging face 108 and an upper inclined face 109.

The rearward ends of the guide bars 104 are twisted and bent downwardly to provide a pair of spaced supports 110 which rotatably support a sheave 111 over which a suitable belt or chain 112 is adapted to operate. The chain 112 provides the means for operating the conveyor and one end thereof is secured to the bolt 113 which secures the cross member 106 to the slide bar 105. The other end of the chain 112 is secured to one end of a link 114 which hooks around an adjustable hook 115 carried by the upper lever cross bar 44. Coil tension springs 116 secured to the side frames 1 and to the cross bar 106 tend to hold the cross bar 106 toward the forward end of the supporting members 102 and 104, as shown in Fig. 1. Upon forward movement of the pusher 47, the chain 112 slides the ratchet supporting bar 106 rearwardly along the supporting bars 102 and 104, the vertical faces 108 of the ratchets 107 engaging the ends of the adjacent conveyor slat 99 and thereby moving the conveyor belt a distance equal to the length of travel of the pusher 47, so that a loaf of bread can be discharged onto the elevator device. As the pusher moved rearwardly to its retracted position, the coil springs 116 draw the ratchet bar 106 forwardly with the inclined faces 109 of the ratchets 107 sliding underneath the conveyor slats 99 into position for again moving the conveyor.

The conveyor C, as shown particularly in Figs. 6 and 7, is provided with spaced loaf guiding members 117 which center the loaves of bread with respect to the conveyor slats 99. These conveyor guides 117 are each rigidly secured to the rearward ends of the conveyor side pieces 92 and extend forwardly along the side pieces in spaced relationship and are provided at their forward ends with L-shaped brackets 118 which extend outwardly over the side pieces 92 and are provided with slots 119 therein. These brackets 118 are secured to rigid supports 120 by means of bolts 121 extending through the slots 119. These bolts 121 are preferably provided with wing nuts 122 which can be loosened to permit the forward ends of the conveyor guides 117 to be adjusted so that loaves of bread of different lengths can be accommodated. The forward ends of the guides 117 are preferably so adjusted that the distance between them is slightly less than the distance between the side plates 72 of the elevator devices.

The loaves of bread as they move along the conveyor are moved to a central position by the guide members 117 and are discharged onto the bread supports 75 between the elevator side plates 72, angularly bent portions 150 being provided on the side plates 72 to prevent the bread from being moved too far toward the blades 8.

Figure 4:
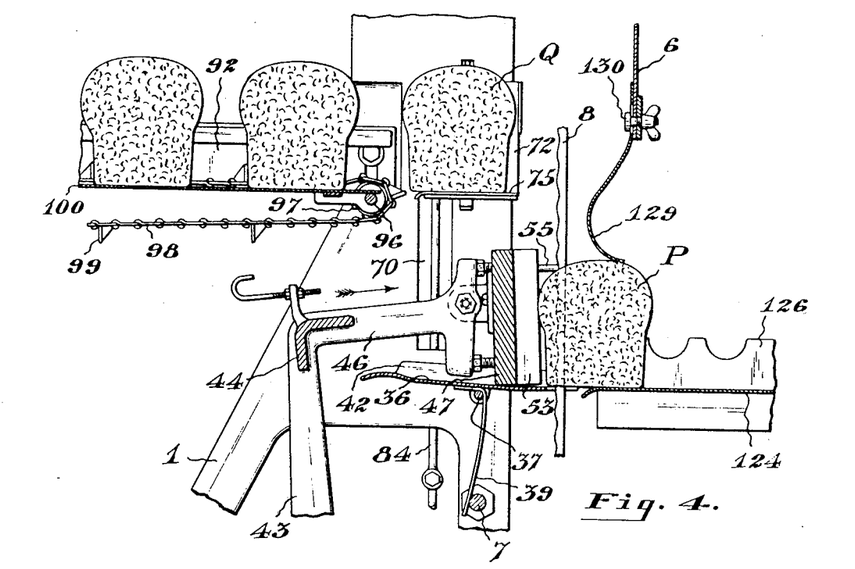
Fig. 4 is a partial section similar to Fig. 3 showing the bread being sliced and showing a second loaf positioned on the elevator or lowering device.
Figure 19:
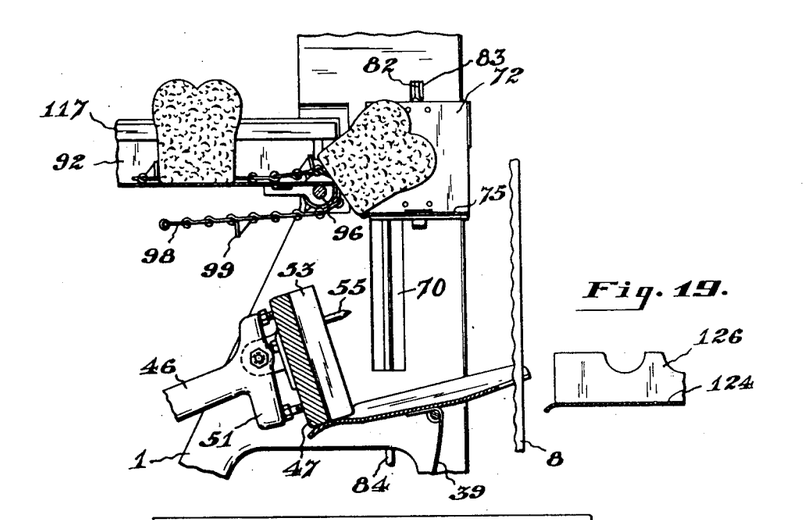
Fig. 19 is a section similar to Fig. 4 showing the conveyor adjusted to discharge the bread onto its side face.

Referring particularly to Figs. 3, 4 and 19, the conveyor can be vertically adjusted by means of the bolts 94 and the slots 95 in the side frames 1.

When the conveyor is adjusted to its lowest position, as shown in Figs. 3 and 4, the apron 100 thereof is substantially in horizontal alignment with the bread supports 75 of the elevator devices so that the bread can be discharged onto the elevator devices, as shown in Fig. 4. However, as shown in Fig. 19, when the conveyor is adjusted to its uppermost position, the apron 100 thereof is positioned somewhat above the elevator bread supports 75 so that as shown, the bread when it leaves the forward end of the conveyor will fall on its side face onto the elevator supports. This adjustment is provided to accommodate loaves of bread having a V-shaped depression in the top side. These loaves are rather difficult to slice when they are fed, as shown in Fig. 3, because the depression permits the same to compress, but when fed with the top facing the cutting blades, such loaves can be easily sliced without crushing.

Figure 18:
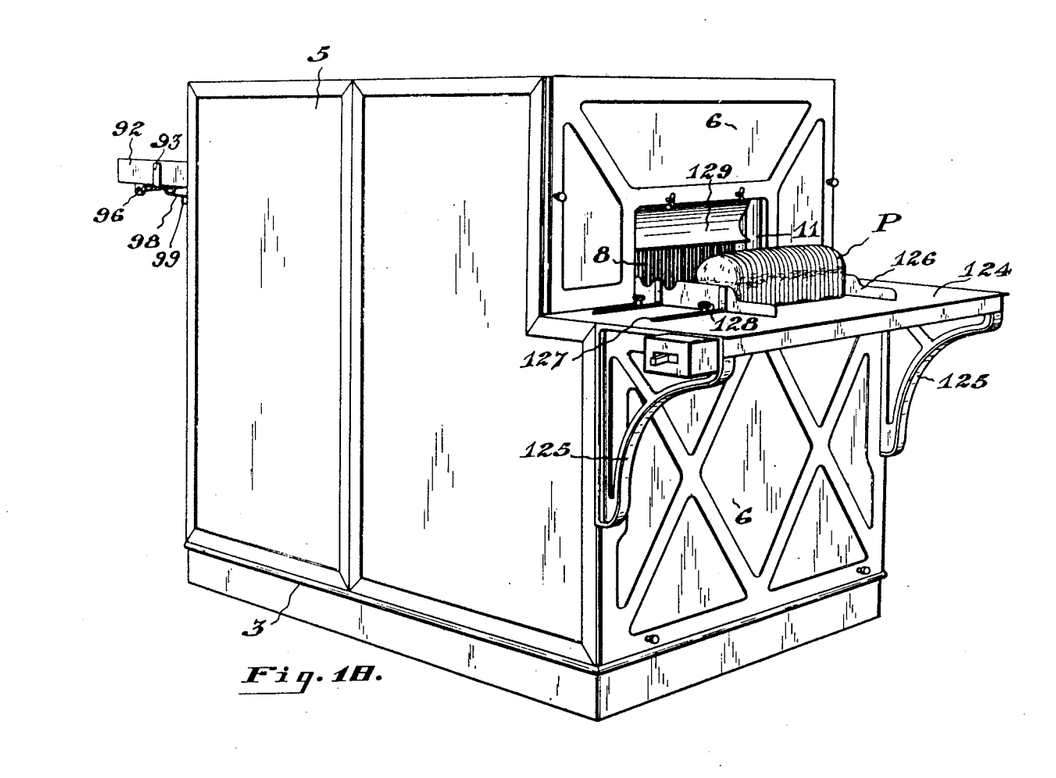
Fig. 18 is a perspective view of the completely enclosed machine showing a loaf of bread in delivered position between the delivery table guides.

As shown in Figs. 1 and 18, the slicing machine is further provided with a delivery table 124 positioned adjacent the cutting blades 8 and substantially in the plane of the feed table 36, to receive the sliced bread as it leaves the cutting blades. The table 124 is preferably supported on brackets 125 which are carried by the framework for the sheathing 5 which encloses the machine.

The delivery table 124 is provided with a pair of spaced guides 126 positioned in the path of the bread as it leaves the cutting blades 8, which engage the ends of the loaf and hold the slices in substantial loaf form until they can be secured together in some suitable manner and wrapped. Each of these guides 126 is provided with slotted brackets 127 which are adjustably secured to the delivery table 124 by thumb screws 128. The guides 126 can be moved toward or away from each other, as desired, to accommodate loaves of bread of different lengths, or can be angularly positioned so that the sliced bread can be slightly compressed, to permit the same to be bodily lifted from between the guides and deposited in a carton or other slice retaining means.

The bread, as it is delivered onto the delivery table 124, is laterally guided by the side guides 126 and is further guided by a curved depending member 129 which is adjustably secured by a bolt 130 to the upper door 6 and extends across the opening therein through which the bread is discharged onto the delivery table 124. The curved guide member 129 engages the top surface of the loaf of bread as it is moved through the slicing blades and holds the same against vertical movement as it is being sliced.

Figure 20:
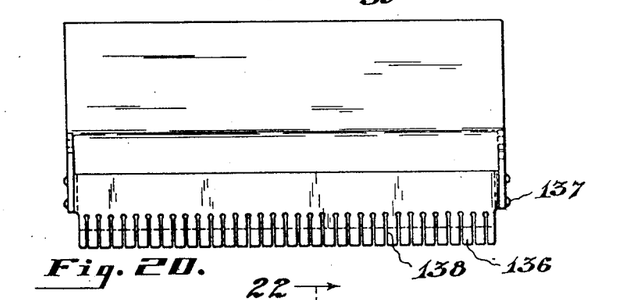
Fig. 20 is a plan view of an optional feed table having upper and lower guides for the cutting blades.
Figures 21, 22:
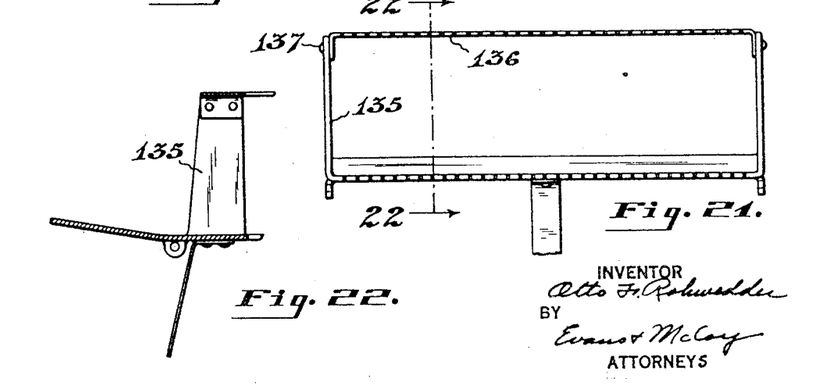
Fig. 21 is a front elevation of the table shown in Fig. 20.
Fig. 22 is a section taken on the line 22—22 of Fig. 21.

An alternative form of feed table is shown in Figs. 20 to 22, inclusive. This feed table is of the same general construction as the table previously described and is further provided with vertical side members 135 having an upper blade guiding member 136 extending therebetween and secured thereto by suitable rivets 137. This member 136, like the body portion of the table, is provided with a plurality of narrow spaced slots 138 therein in alignment with the slots in the forward edge of the body portion of the feed table. The guiding member 136 is spaced a sufficient distance above the body portion of the table so that a loaf of bread can be moved therebetween, and extends forwardly so that the cutting blades will always be positioned in the upper and lower slots regardless of the tilted position of the table. By providing the feed table with such a blade guide member, it is possible to guide the blades both above and below the loaf of bread being cut, so that vibration and heating up of the blades can be eliminated.

In describing the operation of the bread slicing machine of the present invention, it will be assumed that the machine has just been set in motion and that loaves of bread are being fed onto the conveyor C in any suitable manner. As previously described, the cutting blades 8 reciprocate with considerable speed in opposite directions and the pusher 47 reciprocates at a relatively slow speed.

The loaves of bread are supported on the apron 100 of the conveyor and are intermittently moved forward by the cross pieces or belt slats 99. If the loaves should be positioned on the conveyor somewhat to one side thereof, they are automatically moved to a central position by the side guides 117 as they reach the forward end of the conveyor. Assuming that a loaf of bread P has just been deposited onto the feed table 36, the pusher 47 moves forwardly over the feed table 36, engages the loaf P and moves the same forward to the cutting blades 8 with the corner first engaging the blades as indicated in broken outline in Fig. 3. The pusher 47 further very slowly continues its forward movement while the corner of the loaf P is being sliced, and after the corner has been severed, the pusher feeds the bread to the cutting blades at a slightly greater speed, meanwhile the pressure in the spring 39 is moving the table to a lesser tilted position. By the time the entire side crust is completely severed, the bread is being fed at greater speed and is moved substantially in a horizontal direction, and is then fed at a greatly accelerated speed through the blades 8. It is apparent that by at first slowly feeding the bread P to the blades at an angle, a corner of the crust is severed and by slightly accelerating the speed and feeding the same at an angle until the entire side crust is severed, the bread if it is moist and squashy inside the crust will not crush and consequently cause the slicing blades 8 to heat up.

Figure 5:
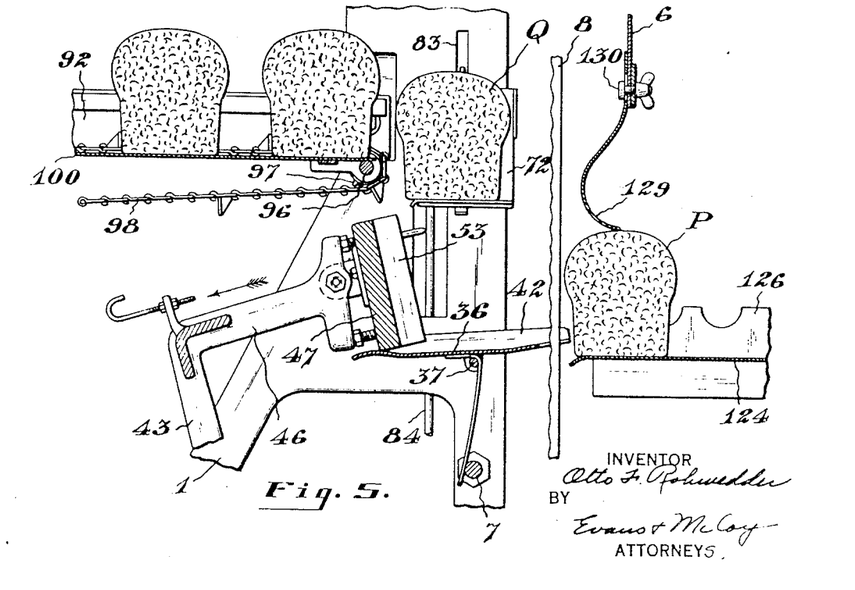
Fig. 5 is a section similar to Fig. 4 showing the loaf moved past the cutting blades and showing the pusher in partially retracted position and the second loaf partially lowered to the feed table.

At the same time as the pusher is feeding the loaf P to the slicing blades 8, the conveyor actuating device is moving the upper side of the conveyor belt forward and by the time the loaf P is almost completely sliced the conveyor has moved a loaf of bread Q on to the bread supports 75 of the elevator devices, as shown in Fig. 4. The loaf P is moved underneath the horizontal curved guide 129 and is finally completely sliced and moved onto the delivery table 124 between the guides 126. The pusher then moves rearwardly, tilting the table to its normal position, and as it nears its retracted position, the elevator devices start to lower, as shown in Fig. 5, so that by the time the pusher 47 reaches its completely retracted position the elevator devices approximate their lowermost positions and the latches 80 thereof are, as previously described, disengaged from the portions 79 of the bread supporting members 75 and thereby permit the supporting members 75 to swing downwardly, as shown in Fig. 10, and discharge the loaf Q on the feed table 36 in the correct slicing position.

As the pusher 47 again moves forward, the elevator devices are again raised and as they reach their uppermost positions the bread supporting portions 75 are swung to their horizontal bread supporting positions ready to receive another loaf of bread, thus completing the cycle of operation.

It is to be noted from the drawings and foregoing description, that the pusher 47, the elevating devices and the intermittently operated conveyor are so synchronized that the operation of slicing bread is substantially continuous which results in a considerable saving in time.

It is to be further noted that the actuating apparatus and particularly the slicing blades are substantially completely enclosed so that operators of the machine are protected against injury.

It is also apparent that by the practice taught in this invention, freshly baked bread can be very satisfactorily and quickly cut by first severing a corner of the crust and feeding the same slowly while the corner is being severed, and thereafter accelerating the feeding speed and changing the angle of cutting until the loaf is completely sliced.

It is further apparent that loaves of different length can be sliced since all the various parts of the machine are made adjustable so that such loaves can be accommodated.

Furthermore, it is to be understood that the particular forms of apparatus shown and described, and the particular procedure set forth, are presented for purposes of explanation and illustration and that various modifications of said apparatus and procedure can be made without departing from my invention as defined in the appended claims.

What I claim is:

1. In a bread slicing machine, the combination with a supporting frame provided with reciprocable knives, of a tiltable feed table, and means for feeding a loaf of bread from said table to said knives in an angular position.

2. In a bread slicing machine, the combination with a supporting frame provided with reciprocable knives, of a tiltable feed table, and means for feeding a loaf of bread from said table to said knives in an angular position and for moving the loaf to a horizontal position as it passes through said knives.

3. In a feeding mechanism for a bread slicing machine having a plurality of cutting members, a feed table tiltably mounted adjacent to and normally inclined toward said cutting members, and means for rocking said table to a substantially horizontal position as the bread advances therefrom through said cutting members.

4. In a bread slicing machine, the combination with a frame having a plurality of reciprocable slicing blades mounted thereon, a tiltable feed table adjacent to and normally inclined toward said blades, a movable pusher mounted on said table for moving said loaf to said slicing blades and for tilting said table from an inclined to a horizontal position as said loaf is moved to said blades, and means for actuating said pusher.

5. In a bread slicing machine, the combination with a frame having a plurality of reciprocable slicing blades mounted thereon, a tiltable feed table adjacent to and normally inclined toward said blades, a movable pusher mounted on said table for moving said loaf to said slicing blades and for tilting said table from an inclined to a horizontal position as said loaf is moved to said blades, spring means for holding said feed table against said pusher as said pusher is moved thereover during and after its feeding movement, and means for actuating said pusher.

6. In a bread slicing machine, the combination with a plurality of cutting blades, of means for initially presenting a corner of a loaf of bread to be sliced to said blades whereby the corner of said loaf may be severed before a face thereof, said means comprising a tiltable feed table normally inclined toward said blades, a pusher movable over said table for feeding the loaf supported thereby to said blades, and means for actuating said pusher.

7. In a bread slicing machine, the combination with a plurality of cutting blades, of means for initially presenting a corner of a loaf of bread to be sliced to said blades whereby a corner of said loaf may be severed before a face thereof, said means comprising a tiltable feed table normally inclined toward said blades, a pusher movable back and forth over said table for feeding the loaf supported thereby to said blades and for tilting said table from an inclined to a horizontal position after sa'd corner has been severed, and means for actuating said pusher.

8. In a bread slicing machine, the combination with a plurality of cutting blades, of means for initially presenting a corner of a loaf of bread to be sliced to said blades whereby the corner of said loaf may be severed before a face thereof, said means comprising a tiltable feed table normally inclined toward said blades, a pusher movable back and forth over said table for feeding the loaf supported thereby to said blades and for tilting said table from an inclined to a horizontal position after said corner has been severed, spring means for holding said table against said pusher as said pusher is moved thereover, and means for actuating said pusher.

9. In a bread slicing machine, the combination with a plurality of cutting blades, of means for initially presenting a corner of a loaf of bread to be sl'ced to said blades whereby the corner of said loaf may be severed before a face thereof, said means comprising a tiltable feed table normally inclined toward said blades, a pivoted pusher swingable back and forth over said table and contacting therewith for feeding the loaf supported by said table to said slicing blades and for tilting sa'd table from an inclined to a horizontal position after said corner has been severed, and means for actuating said pusher.

10. In a bread slicing machine, the combination with a frame, of a plurality of cutting blades, a tiltable feed table adjacent to said blades for supporting a loaf of bread, said table being normally inclined toward said blades, a reciprocable pusher movable over said table for feeding the bread to said blades with the corner of the loaf initially presented thereto and for gradually moving said table to a horizontal position after the corner of the loaf is severed, and means for moving said pusher toward said blades relatively slowly as the blades initially engage the corner of the loaf and for accelerating the feeding movement as the bread passes through the blades.

11. In a bread slicing machine having a plurality of cutting blades and a feed table adjacent said blades, a pusher movable over said table for feeding a loaf of bread to said blades, and a plurality of spaced fingers secured to and extending beyond the face of said pusher, said fingers being adapted to engage the upper surface of said loaf and firmly hold the same against said feed table during the cutting operation.

12. In a bread slicing machine, a plurality of slicing blades, a feed table adjacent one side of said blades, a delivery table adjacent the other side of said blades, a pusher for moving a loaf of bread over said feed table to said blades and onto said delivery table, and means for holding the loaf against vertical movement during the cutting operation comprising a plurality of fingers secured to and extending beyond the face of said pusher, said fingers being adapted to engage the top surface of said bread as it is moved over said feed table, and a horizontal guide member positioned above said delivery table and adjacent said blades, said guide member being engageable with the top surfaces of the slices of said loaf as it leaves said blades.

13. In a bread slicing machine, a plurality of reciprocable cutting blades, a feed table adjacent said blades for supporting a loaf of bread being sliced, a plurality of lower closely spaced fingers on the forward edge of said table extending between said blades, and a horizontal plate secured to said table above the supporting surface thereof and also having a plurality of upper closely spaced fingers extending between said blades, said blades having sliding contact with said lower and upper fingers, whereby said blades are held against lateral vibration above and below the loaf being sliced thereof.

14. In a bread slicing machine, a plurality of cutting blades, a feed table adjacent said blades for supporting a loaf of bread, vertically reciprocable elevator devices for discharging a loaf of bread onto said feed table, and a conveyor for discharging a loaf of bread onto said elevator devices, said conveyor being vertically adjustable whereby in one position it may discharge the loaf of bread on its bottom face onto said elevator devices, and in another position it may discharge the loaf on its side face onto said devices.

15. In a bread slicing machine having a plurality of cutting blades and a feed table adjacent said blades for supporting the loaf of bread being sliced, means for feeding the bread to said blades comprising a pair of reciprocable pivoted pusher arms, a pusher positioned above said table and pivoted to said pusher arms, screw means on said pusher at either side of the pivotal axis thereof for holding said pusher against pivotal movement with respect to said arms, and means for actuating said arms.

16. In a bread slicing machine, a frame, a plurality of reciprocable slicing blades mounted on said frame, a tiltable feed table pivoted to said frame adjacent and normally inclined toward said blades, a pair of pusher levers pivoted at their lower ends to said frame, and a pusher secured to the other ends of said levers and normally positioned above said table, a rotatable cam and a connection between said levers and cam whereby rotation of said cams causes said pusher to reciprocate back and forth over said table and feed the loaf of bread supported by said table to said blades.

17. In a bread slicing machine, a frame, a plurality of reciprocable slicing blades mounted on said frame, a tiltable feed table pivoted to said frame adjacent and normally inclined toward said blades, a pair of upwardly extending angular pusher levers pivoted at their lower ends to said frame, a pusher secured to the upper ends of said levers and resting on said table, a rotatable cam, a connection between said levers and cam whereby rotation of said cam causes said pusher to reciprocate over said table and move said table from an inclined to a horizontal position, and resilient means for holding said table against said pusher as said pusher is moved thereover.

18. In a multiple bladed bread slicing machine, a plurality of cutting blades and a mechanism for feeding loaves of bread to said cutting blades comprising a tiltable feed table pivoted to the frame of the machine and normally inclined toward the cutting blades, movable pusher arms having their lower ends pivoted to said frame and having angular extensions at their upper ends extending forwardly above said table, a pusher secured to forward ends of said pusher arm extensions and having regularly spaced integral flanges on its forward face adapted to pass between the cutting blades, and means for reciprocating said pusher arms, said pusher upon forward movement of said arms being arranged to shift said table to a substantially horizontal position as the bread supported by said table travels through said blades.

19. In a multiple bladed bread slicing machine having a supporting frame, a plurality of cutting blades and mechanism for feeding loaves of bread to said cutting blades, said mechanism comprising a tiltable feed table pivoted to said frame, reciprocable pusher arms having their lower ends pivoted to said frame and having their upper ends bent at an angle to extend over said table in their forward position, a pusher head pivotally secured to said arms and adapted to slide over said table, spring means holding said table against said pusher head, and means for driving said pusher arms forwardly and rearwardly over said table.

OTTO F. ROHWEDDER.